United States Patent [19]

Kudryavtsev et al.

[11] 4,257,888
[45] Mar. 24, 1981

[54] CARTRIDGE FILTER

[76] Inventors: Boris B. Kudryavtsev, ulitsa Menzhinskogo, 21, kv. 227, Moscow; Valentin P. Krasnokutsky, Novo-uglichskoe shosse, 65, kv. 51, Zagorsk; Lev A. Fedotov, ulitsa A. Dikogo, 5, korpus 2, kv. 15, Moscow; Semen F. Sholk, Zvenigorodskoe shosse, 3-a, kv. 223, Moscow; Jury R. Svidler, Znamenskaya ulitsa, 35, kv. 22, Moscow; Ivan V. Zhigarev, ulitsa Kostanaevskaya, 40, kv. 4, Moscow; Nikolai N. Begunov, Izmailousky bulvar, 9, kv. 40, Moscow; Valentin F. Kostylev, Zvenigorodskoe shosse, 3-a, kv. 243, Moscow; Jury M. Brodsky, Sevastopolsky prospekt, 83, korpus 1, kv. 49, Moscow; Vadim A. Knyazev, Leninsky prospekt, 72, kv. 239, Moscow, all of U.S.S.R.

[21] Appl. No.: 35,063

[22] Filed: May 1, 1979

[51] Int. Cl.³ ............................................. B01D 27/00
[52] U.S. Cl. ..................................... 210/97; 210/236; 210/330
[58] Field of Search ................. 210/97, 102, 107, 134, 210/232, 234, 236, 237, 341, 330

[56] References Cited

U.S. PATENT DOCUMENTS

| | | | |
|---|---|---|---|
| 2,081,009 | 5/1937 | Kelley | 210/236 X |
| 2,838,084 | 6/1958 | Samler | 210/107 X |
| 3,279,608 | 10/1966 | Soriente et al. | 210/232 |
| 3,447,684 | 6/1969 | Morrison | 210/108 |
| 3,767,053 | 10/1973 | Bavin | 210/232 |
| 3,804,758 | 4/1974 | Cooper et al. | 210/236 X |

Primary Examiner—John Adee
Attorney, Agent, or Firm—Fleit & Jacobson

[57] ABSTRACT

According to the invention, a cartridge filter for cleaning liquids and gases from mechanical impurities comprises compartments containing filtering cartridges, a pressure difference indicator and a control unit. The compartments are provided with cover plates having pipes for filtering and cleaning the compartments containing the cartridges, perforated guides and a spring device for locking the cartridges. The filter is also provided with mechanisms for moving the compartments and cover plates and a device for storing and replacing the filtering cartridges. The filter according to the invention enables an improved productivity owing to the elimination of manual operations of disassembly, replacement of cartridges and assembly of the filter, compliance with sanitary requirements and reduction of losses of filtered product.

10 Claims, 4 Drawing Figures

CARTRIDGE FILTER

FIELD OF THE ART

The invention relates to filters for cleaning liquids and gases, and more particularly to cartridge filters.

The invention may be used for cleaning varnishes, paints, enamels, bitumens and resins in the varnish and paint manufacturing industry; for cleaning beverages, marinades, food oils, honey and coffee in the food industry; for cleaning acetone, methanol, antifreeze liquids, glycerin, oil and its derivatives, as well as combustion gases in the petrochemical industry; for cleaning chloroform, desinfectants, perfumes, lotions, shampoos and creams in the pharmaceutical industry; for cleaning air, gases and water for thermal utility plants; for cleaning fats and waste liquors in refrigerating plants; for cleaning oils and emulsions in the machine tools manufacture and in other industries.

BACKGROUND OF THE INVENTION

A growth of production in various industries and increased requirements to the quality of products, as well as an increase in labour productivity, improvement of labour conditions in the manufactures using toxic products result in the need to provide new high-performance filters eliminating manual labour.

Known in the art is a filter (U.S. Pat. No. 3,447,684, Cl. 210-108 of June 3, 1969) having two alternately operating filtering elements and a pilot valve for automatically switching over the supply of filtered fluid. When the filter is contaminated, a pressure difference sensor operates to control a pilot valve switching mechanism. The pilot valve returns a portion of the outflowing filtrate for regenerating the filtering element by the reverse flow.

Known in the art is a filter manufactured by "AMF Cuno Incorporated" for filtering liquids and gases through throw-away thin-walled filtering cartridges having a pre-set pore size. The cartridges are placed in tightly sealed compartments or a number of compartments interconnected by a distribution device. During filtering, a fluid being cleaned passes through the walls of the cartridge to be filtered, and contaminants remain in the cartridge walls. As the particles accumulate, the resistance offered by the cartridge increases and the throughput capacity of the filter decreases. To maintain optimum throughput capacity of the filter, the flow of a product being cleaned is switched over to another compartment containing new cartridges, and the filtering cartridges are replaced manually in the disconnected compartment.

"AMF-Cuno" manufactures filters having one, two, three, nine, eighteen, forty two and two hundred fifty six cartridges. The filters comprise a casing having a removable cover plate and perforated guides in the form of tubes for fixing the cartridges and for removal of filtrate.

The filter has a low productivity owing to the need in manual operations of disassembly of the filter, replacement of cartridges and assembly of the filter. Much time being spent for replacement of cartridges, the number of concurrently operating filtering cartridges should be increased. Non-uniform washing of cartridges in multicartridge filters results in losses of product being filtered. In addition, sanitary conditions are not complied with during disassembly and replacement of cartridges.

SUMMARY OF THE INVENTION

It is an object of the invention to automate the operations of filtering and replacement of filtering cartridges.

The invention resides in that in a cartridge filter for cleaning liquids and gases under pressure from mechanical impurities, comprising compartments containing filtering cartridges having cover plates provided with pipes for admission and removal of liquid and gaseous products at the filtering stage and for cleaning the compartments containing the cartridges, and a pressure difference indicator, according to the invention, there is provided a device for storing and replacing the filtering cartridges, a mechanism for moving the compartments, a mechanism for moving the cover plates and a control unit. In addition, the compartments are provided with perforated guides arranged outside the cartridges and a spring device for locking the filtering cartridges.

The device for storing and replacing the filtering cartridges may comprise rigidly interconnected sleeves containing the cartridges and may have a drive causing its movement. The cartridges may be arranged along a circle and may be movable around the axis of the device by means of a rotation mechanism.

The rigidly interconnected compartments may be arranged along a circle, and the device for storing and replacing the filtering cartridges may comprise a holder having springs.

The mechanisms for moving the compartments and cover plates and the drive for moving the filtering cartridges preferably comprise hydraulic cylinders.

These and other objects will become apparent from the description of a particular embodiment of the invention with reference to the accompanying drawings, in which.

DETAILED DESCRIPTION OF THE INVENTION

Figure 1:
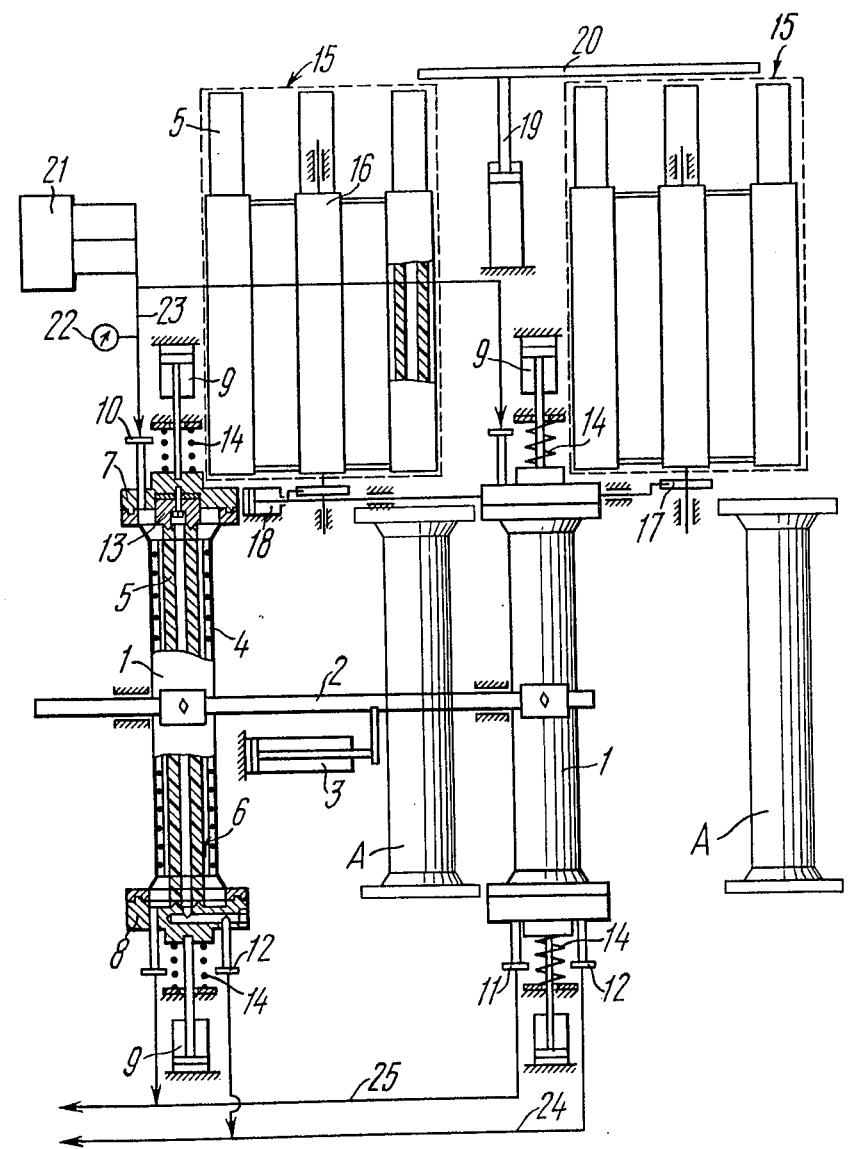
FIG. 1 shows a construction of a cartridge filter according to the invention.

A cartridge filter consists of one or several compartments 1 (FIG. 1) mounted on movable guides 2 connected to a mechanism for moving the compartments 1, comprising a hydraulic cylinder 3. The compartments 1 contain perforated guides 4 for positioning filtering cartridges 5 and a spring device 6 preventing an inadvertent fall out of the cartridges during their replacement. The compartments 1 are closed on either side by cover plates 7 and 8 mounted on piston rods of mechanisms for their movement comprising hydraulic cylinders 9. The cover plate 7 has a pipe 10 for admission of a contaminated product, a clean solvent and an inert gas. The cover plate 8 has pipes 11, 12 for draining residues and for removal of clean product. The cover plate 7 has a sealing member 13. Both cover plates 7, 8 are urged against the compartments 1 by means of springs 14 ensuring the tightness. Provided over each compartment 1 is a device 15 for storing and replacing the filtering cartridges 5, having sleeves 16 containing the filtering cartridges 5. The device 15 also has a ratchet mechanism having a rotation mechanism comprising a hydraulic cylinder 18. For inserting new cartridges 5, the compartments 1 have a drive for moving the cartridges 5, comprising a hydraulic cylinder 19 having a bar 20.

The filter is provided with a control unit 21 and a pressure difference indicator 22 in the admission pipeline.

A contaminated product, an inert gas and a solvent are fed to the pipe 10 from the control unit 21 through a pipeline 23, clean product is fed from the pipe 12 to a pipeline 24, and residues of contaminated product are fed from the pipe 11 along a pipeline 25.

The sleeves 16 (FIG. 2) are rigidly connected to one another and are arranged along a circle for movement around the axis of the device 15 (FIG. 1) for storing and replacing the filtering cartridges 5.

Figure 2:
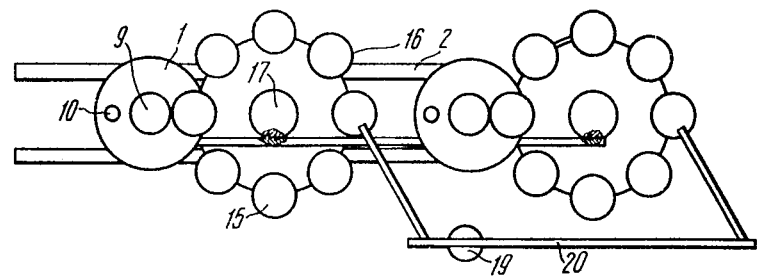
FIG. 2 is a plan view of the cartridge filter according to the invention.
Figure 3:
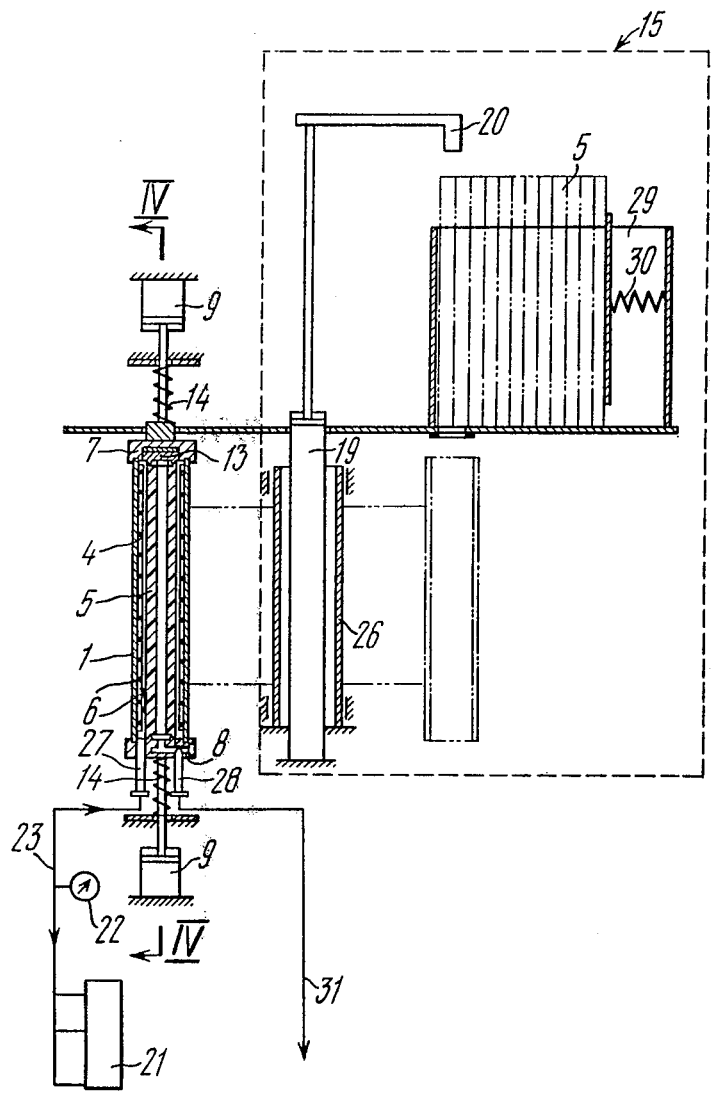
FIG. 3 shows an embodiment of the cartridge filter having a device for storing and replacing filtering cartridges, comprising holders, according to the invention.

In another embodiment the filter consists of compartments 1 (FIG. 3) rigidly interconnected to one another. The compartments are movable around a central axle 26 by means of a displacement mechanism comprising a hydraulic cylinder 3 (FIG. 1). The compartments 1 (FIG. 3) contain perforated guides 4 for positioning the cartridges 5 and a spring device 6 for preventing an inadvertent fall out of the cartridges 5 during their replacement. The compartments 1 are closed on either side by cover plates 7 and 8 which are mounted on piston rods of hydraulic cylinders 9. The cover plate 7 has a sealing member 13, and the cover plate 8 has a pipe 27 for admission of contaminated product, an inert gas and a clean solvent and for draining residues before the washing, and a pipe 28 for removal of clean product, a solvent and a gas at the stage of washing and purging of the cartridges 5 and compartment 1. Both cover plates 7, 8 are urged against the compartments 1 by springs 14. Mounted over each compartment 1 is a device 15 for storing and replacing the filtering cartridges 5, comprising holders 29. The device 15 has a mechanism for moving the cartridges 5, comprising a hydraulic cylinder 19 having bars 20. A pressure difference indicator 22 is incorporated in an admission pipeline 23. The filter has a control unit 21.

The filter is connected to a pipeline 31 which removes clean product and contaminated solvent and purging gas from the pipe 28.

Figure 4:
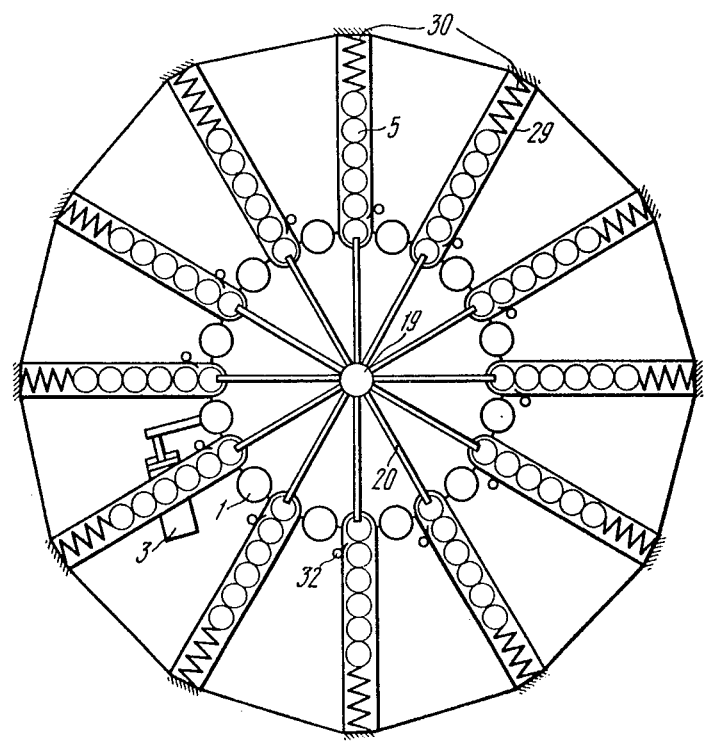
FIG. 4 is a sectional view taken along the line IV—IV in FIG. 3, according to the invention.

The compartments 1 (FIG. 4) containing the filtering cartridges 5 are connected to one another and are arranged along a circle. The holder 29 contains the filtering cartridges 5, springs 30 and detachment numbers 32.

The cartridge filter according to the invention functions in the following manner.

A contaminated product under pressure is fed to the pipe 10 (FIG. 1) of the cover plate 7 of the compartment 1 containing the filtering cartridges 5 and passes through the walls of the cartridges 5 from the outside into the interior thereof to be cleaned and removed through the pipe 12 of the cover plate 8. As the cartridges 5 are contaminated, pressure in the admission pipeline 23 increases. When a pre-set pressure value is achieved, the pressure difference indicator 22 feeds a signal, and the control unit 21 feeds a sequence of commands for disconnection of product supply, draining of residue, purging with an inert gas, washing with a solvent and secondary purging. Then the hydraulic cylinders 9 are automatically actuated, and the cover plates 7 and 8 are opened. The hydraulic cylinder 3 moves the compartments 1 into the position A for replacement of the cartridges 5, and the device 5 loads new cartridges 5 into the compartments by means of the hydraulic cylinder 19. The new cartridges 5 are inserted to the compartments 1 to expell the waste cartridges which are removed from the compartments 1, and the new cartridges take the place of the waste ones. Then the compartments 1 are returned back into the initial position by the hydraulic cylinder 3, the springs 14 close the cover plates 7, 8, and the control unit 21 feeds a command for a next filtering cycle, while the rotation mechanism comprising the hydraulic cylinder 18 rotates the sleeve 16 (FIG. 2) through one step.

By selecting different number of compartments 1 (FIG. 1) filters of various productivity may be provided.

In case one row of stand-by compartments 1 is provided, a continuous operation of the filter may be ensured automatically by disconnecting one of the rows upon pressure increase and concurrently connecting the stand by row. The pressure in the admission pipeline thus decreases anew, and the waste row is recharged. Upon next pressure increase, the cycle is repeated, but it is the next row which is disconnected. This operation continues until all filtering compartments of the filters are recharged.

In case the device 15 comprises the holders 29 (FIG. 3), and the compartments 1 (FIG. 4) are arranged along a circle, the filtering cartridges are moved in the holder 29 by means of the spring 30, and the cartridges 5 are locked in the holder 29 during the replacement by means of the detachment members 32. The arrangement of the compartments 1 in a circle and the provision of the device 15 comprising the holders 29 enable a reduction of the filter size and permits a larger number of the compartments 1 (FIG. 1) to be accommodated on the same area thus improving the throughput capacity of the filter.

The cartridge filter according to the invention has the following advantages:

high productivity owing to the elimination of manual operations of disassembly, replacement of the cartridges 5 and assembly of the filter;

reduction of the number of concurrently operating cartridges 5 owing to the reduction of auxiliary operations of replacement of the filtering cartridges 5;

elimination of unsanitary conditions during disassembly and replacement of the filtering cartridges 5;

reduction of manual labour by about 90%;

reduction of losses of filtered products owing to better conditions for washing and purging of waste filtering cartridges.

What is claimed is:

1. A cartridge filter comprising:
   a movable housing whose interior surface defines a filter compartment formed as an elongated cavity open at both ends for accommodating filtering cartridges;
   means for replacing cartridges positioned in said cavity with fresh cartridges, said replacing means being in spaced relationship with said filter compartment;
   means for moving said housing from an initial position to said means for replacing and for returning said housing to the initial position;
   movable cover means for closing the cavity ends mounted externally of said movable housing;
   pipe means connected to said cover means for charging and discharging fluid to be filtered into or from the filter compartment;

means for moving and bringing said cover means into and out of sealing engagement with the ends of said cavity;

said means for replacing cartridges including means for storing fresh cartridges; and means for moving a fresh cartridge from said storing means to said housing cavity, the top end of said cavity being alignable with said storing means.

2. A filter as claimed in claim 1, comprising pressure sensitive means for sensing the pressure of a fluid entering the filter compartment during operation, and control means coupled to said pressure sensitive means for controlling the operation of the means for bringing the covers into and out of sealing engagement, said pressure sensitive means furnishing a signal to said control means when the pressure of said fluid attains a certain predetermined threshold.

3. A filter as claimed in claim 1, comprising transfer means for picking a cartridge out of the means for storing fresh cartridges and inserting the cartridge end first into the filter housing cavity.

4. A filter as claimed in claim 1, wherein the cavity comprises perforated guide strips for the alignment of the cartridges.

5. A filter as claimed in claim 1, wherein the cavity is provided with brake springs for fixing the cartridges in place.

6. A filter as claimed in claim 2, wherein the means for storing fresh cartridges comprises a rotary housing having a plurality of sleeves open at both ends and arranged along a circumference relative to the center of the storing means, and means for rotating said rotary housing for consecutive alignment of said sleeves with the open end of the cavity.

7. A filter as claimed in claim 2, wherein the means for storing fresh cartridges comprises a fixed holder in which the cartridges are arranged linearly, said holder comprising means for linearly transferring said cartridges to assure consecutive discharging of the cartridges out of the holder with the aid of the transferring means.

8. A filter as claimed in claim 6, comprising means for effecting translational movement of the movable housing for docking of the filter housing with the means for storing fresh cartridges.

9. A filter as claimed in claim 7, comprising a plurality of housings arranged along a circumference and movable along said circumference to a position of docking with the means for storng fresh cartridges and returnable to their original position, each of said housings having a matching cartridge holder and transfer means.

10. A cartridge filter comprising a movable housing defining an elongate open-ended compartment for a replaceable filter cartridge, a filtering station, a cartridge-replacement station spaced from said filtering station, an indexing means for moving said housing between said stations for replacement of a used cartridge in said housing, said filtering station including end plates for sealing the open ends of said compartment, conduit means associated with said end plates for delivering fluid to be filtered to and from said compartment, and cover plate shifting means for moving said cover plates into and out of sealing engagement with the ends of said compartment, said cartridge-replacement station including storage means for fresh filter cartridges and transfer means for moving a fresh cartridge from said storage means endwise into said housing when said housing is located at said cartridge replacement station.

* * * * *